(12) United States Patent
Drimer

(10) Patent No.: US 10,000,937 B2
(45) Date of Patent: Jun. 19, 2018

(54) INFLATABLE CONNECTOR

(71) Applicant: Technion Research & Development Foundation Limited, Haifa (IL)

(72) Inventor: Nitai Drimer, Moshav Habonim (IL)

(73) Assignee: Technion Research & Development Foundation Limited, Haifa (IL)

( * ) Notice: Subject to any disclaimer, the term of this patent is extended or adjusted under 35 U.S.C. 154(b) by 367 days.

(21) Appl. No.: 14/907,441

(22) PCT Filed: Jul. 31, 2014

(86) PCT No.: PCT/IL2014/050695
§ 371 (c)(1),
(2) Date: Jan. 25, 2016

(87) PCT Pub. No.: WO2015/015499
PCT Pub. Date: Feb. 5, 2015

(65) Prior Publication Data
US 2016/0168870 A1 Jun. 16, 2016

(30) Foreign Application Priority Data
Jul. 31, 2013 (IL) .......................................... 227729

(51) Int. Cl.
*F16L 17/10* (2006.01)
*E04G 1/12* (2006.01)
(Continued)

(52) U.S. Cl.
CPC ................ *E04G 1/12* (2013.01); *A01K 61/60* (2017.01); *E04G 7/24* (2013.01); *F16L 1/24* (2013.01); *F16L 3/085* (2013.01); *F16L 33/223* (2013.01)

(58) Field of Classification Search
CPC ......... F16L 17/00; F16L 17/10; F16L 21/007; F16L 21/05; F16L 37/002; F16L 37/06; Y10T 403/348; Y10T 403/13
See application file for complete search history.

(56) References Cited

U.S. PATENT DOCUMENTS 3,190,679 A * 6/1965 Lester ..................... F16L 17/10
138/93
3,695,637 A * 10/1972 Satterthwaite .......... F16L 17/10
285/145.2
(Continued)

FOREIGN PATENT DOCUMENTS

GB 1161664 8/1969
WO 9622486 A1 7/1996

OTHER PUBLICATIONS

International Search Report from a counterpart foreign application—PCT/IL2014/050695; dated Dec. 22, 2014—3 pages.
(Continued)

*Primary Examiner* — Daniel J Wiley
(74) *Attorney, Agent, or Firm* — Roach Brown McCarthy & Gruber, P.C.; Kevin D. McCarthy

(57) ABSTRACT

An inflatable connector comprising a bladder having at least two pipe securing areas formed as at least two separate cylindrical voids, respectively, in said bladder, wherein said at least two separate cylindrical voids are completely separated by a portion of said bladder and are configured to at least partially encompass at least two pipe portions, respectively, wherein said bladder is configured, when deflated, to enable insertion of said at least two pipe portions into said at least two pipe securing areas, respectively, and wherein said bladder is configured, when inflated, to secure said at least two pipe portions in said at least two pipe securing areas, respectively.

15 Claims, 4 Drawing Sheets

(51) Int. Cl.
*F16L 1/24* (2006.01)
*E04G 7/24* (2006.01)
*A01K 61/60* (2017.01)
*F16L 3/08* (2006.01)
*F16L 33/22* (2006.01)

(56) References Cited

U.S. PATENT DOCUMENTS

| | | | | | |
|---|---|---|---|---|---|
| 3,843,167 | A | * | 10/1974 | Gronstedt | F16L 17/10 174/84 R |
| 4,026,584 | A | * | 5/1977 | Lowe | F16L 17/10 285/369 |
| 4,176,981 | A | * | 12/1979 | Clapper | F16K 1/48 251/57 |
| 4,786,087 | A | * | 11/1988 | Thewlis | F16L 17/10 285/288.7 |
| 5,333,916 | A | * | 8/1994 | Burkit | F16L 17/10 138/99 |
| 6,595,559 | B1 | * | 7/2003 | Readman | F16L 13/10 285/371 |

OTHER PUBLICATIONS

Written Opinion of the International Searching Authority from a counterpart foreign application—PCT/IL2014/050695; dated Dec. 22, 2014—4 pages.

* cited by examiner

INFLATABLE CONNECTOR

FIELD OF THE INVENTION

The invention relates to the field of inflatable connectors.

BACKGROUND

In assembling various structural members, it is desirable that these structural members be quickly and easily assembled in the field. It is also sometimes useful that the connection between the members be flexible to allow some relative motion and to reduce loads.

HDPE (High Density Polyethylene) pipes are nowadays being used in multiple applications, such as aquaculture, and other structures. There is often a need to connect these pipes together, which is usually done by tying them one to another with ropes, metal or plastic clamps and braces, etc. Sometimes, the tying is made through one or more tires, which are placed between the pipes to prevent or cushion collisions or rubbing between the pipes in dynamic conditions (i.e. when the sea is rough). Such a way of tying is many times cumbersome, allows unwanted movement of the pipes, hard to do and undo, and creates strain and damage to the pipes.

U.S. Pat. No. 3,473,829 to Daniels discloses an inflatable connector for clamping opposed peripheral salients on hollow conduits, which comprises an elongated elastomeric body including in cross-section a base portion and a clamping portion including oppositely extending flange portions and movable and deformable jaw portions spaced from the flange portions to form oppositely extending slots for receiving the salients and spaced from each other and the base portion to form an inflatable cavity, and valve structure for expanding and filling the cavity with fluid for moving and deforming the jaw portions apart and around the salients to close the slots and clamp the salients therein.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, an inflatable connector comprising: a bladder having at least two pipe securing areas formed as at least two separate cylindrical voids, respectively, in said bladder, wherein said at least two separate cylindrical voids are completely separated by a portion of said bladder and are configured to at least partially encompass at least two pipe portions, respectively, wherein said bladder is configured, when deflated, to enable insertion of said at least two pipe portions into said at least two pipe securing areas, respectively, and wherein said bladder is configured, when inflated, to secure said at least two pipe portions in said at least two pipe securing areas, respectively.

In some embodiments, said harness comprises a mesh.

In some embodiments, the inflatable connector further comprises an inflation nipple.

In some embodiments, said at least two pipe securing areas are each substantially cylindrical.

In some embodiments, said at least two pipe securing areas are substantially parallel, such that, when said bladder is inflated, said at least two pipe portions are secured substantially parallel to one another.

In some embodiments, said at least two pipe securing areas are non-parallel, such that, when said bladder is inflated, said at least two pipe portions are secured non-parallel to one another.

In some embodiments, said at least two pipe securing areas comprise at least three pipe securing areas.

In some embodiments, said at least two pipe securing areas comprise at least four pipe securing areas.

In some embodiments, said at least two pipe portions are rims of fish cages.

In some embodiments, said at least two pipe portions are scaffolds.

In some embodiments, said bladder is made of an elastomeric material.

In some embodiments, said bladder is filled with a gas.

In some embodiments, said bladder is filled with a liquid.

In some embodiments, said bladder is buoyant when inflated.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1A:
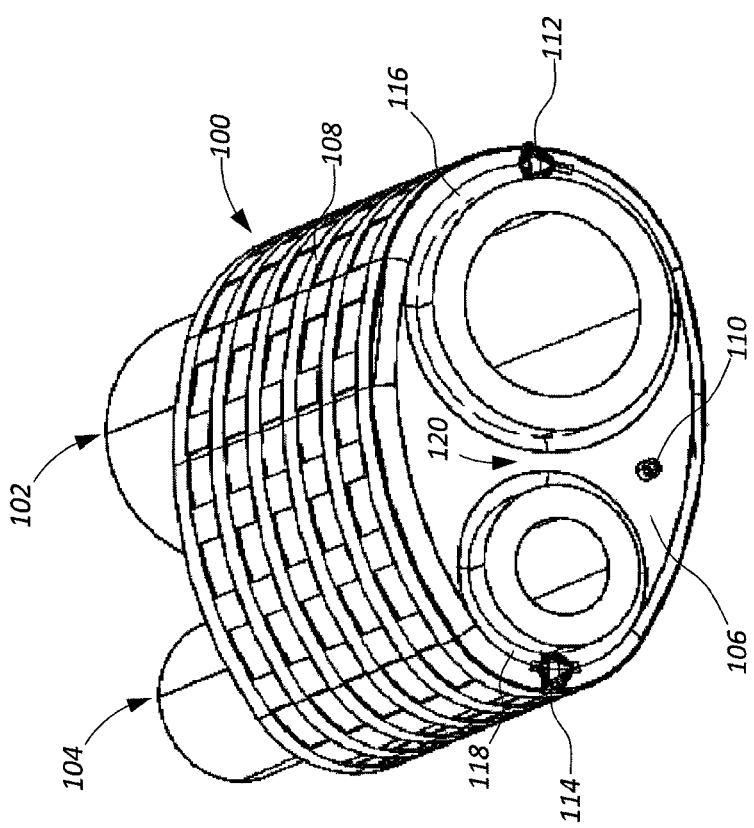
FIG. 1A shows a front isometric illustration of an exemplary inflatable connector, in accordance with an embodiment.

Disclosed herein is an inflatable connector for connecting multiple sections of one or more pipes, rods, scaffolds, and/or other elongated elements, whether hollow or solid (hereinafter generally referred to as "pipes") to each other. Advantageously, the inflatable connector may be an easy to use, compact and lightweight apparatus, configured to allow some relative movement between the connected elements such to reduce loads, and/or configured to damp movements, shocks and/or vibrations between the sections of the pipes in dynamic conditions.

In order to connect the multiple sections to each other, the inflatable connector may include a bladder, inflatable with one or more gaseous and/or liquid materials. The bladder may include multiple pipe securing areas, such as two, three, four or more securing areas. Each of these pipe securing areas may secure a section of a pipe (the same pipe or two or more different pipes), by way of at least partially encompassing that section.

In order to insert the sections of the pipes into the pipe securing areas, the bladder may be deflated or at least partially inflated. Then, the after the sections have been inserted into their pipe securing areas, the bladder may be inflated, so as to provide it with at least some rigidity. In some embodiments, the rigidity achieved by the inflation is sufficient for securing the sections to the bladder. In some embodiments, the securing may be enhanced by usage of an additional securing element, such as a harness which further secures the sections inside their pipe securing areas. The harness, for example, may be a mesh extending over at least a portion of an external surface of the bladder, so as to encircle the bladder and the sections of the pipes together. As another example, the harness may be one or more wires, fabric pieces, hook-and-loop fasteners, Velcro fasteners and/or the like.

The pipe securing areas, or at least some thereof, may be of the same size (width, length, diameter, cross-section and/or the like) or of different sizes. The pipe securing areas, or at least some thereof, may extend parallel to each other inside the bladder, or, alternatively, be unparallel.

The inflatable connector may be suitable for a variety of uses. For example, it may be suitable for connecting between two or more sections of a pipe(s) in a marine environment, where the connector is exposed to water, humidity, and optionally harsh environmental conditions such as waves, winds and/or the like. The bladder, either alone or in combination with its harness, may be positively buoyant, negatively buoyant or neutrally buoyant when inflated.

An exemplary use for the connector is to connect between two adjacent rims of fish cages. Fish cultivation in cages is a form of aquaculture which has gained increased popularity in recent years. This method utilizes cages which are placed in lakes, bayous, ponds, rivers or oceans to contain and protect fish until they can be harvested. In countries with a long aquaculture tradition, such as Japan and Norway, small floating cages started to be installed in the more sheltered areas of bays, fiords, lagoons, etc. However, the lack of oxygen, high temperature fluctuations, concentration of residues, outcrop of seaweed, etc. have gradually caused more open and deeper areas to be sought, and cages designed to withstand the dynamic efforts of areas with scarce shelter to be used. This specific type of cage cultivation is often referred to as "off-shore cultivation".

The trend which may be observed in countries where aquaculture is more developed, involves using increasingly large cages, placing them away from sheltered areas in areas which are increasingly more exposed to the dynamic effects of the waves. This is due to the fact that sheltered areas have smaller flows of water, are shallower and the decay of fiords affects the cultivation system, depriving it of oxygen and poisoning it with the production of hydrogen sulfide; temperature fluctuations are very high, with the consequent risk of diseases. In these countries it may be observed that year after year fish farms are being moved to deeper areas.

In the field of off-shore cultivation, there are known fish farms which are comprised of large floating platforms from which hang and are submerged in water one or many cages which contain the fish being cultivated. The cages are usually obtained from netting. The floating platforms are commonly hollow pipes, positively buoyant, which serve as the top rims of the cages. Usually, a series of cages are connected to one another by their rims, to construct a larger fish farm. Advantageously, connecting each two adjacent cages with the present inflatable connector, may achieve one or more of the following benefits: Firstly, the connector may be easily deployed; it can be transported to the point of installation while in a deflated form, conveniently deployed over the rims of the adjacent cages and inflated using, for example, a simple electrical or manual pump and/or from a tank of compressed gas, such as a scuba diving air tank, or even by mouth inflation. In some embodiment, no additional mechanical tools are necessary for a successful installation. Secondly, the inflatable nature of the connector also endows it with certain resiliency, so it may dampen relative motion between the cages, often caused by waves and currents.

Figure 1B:
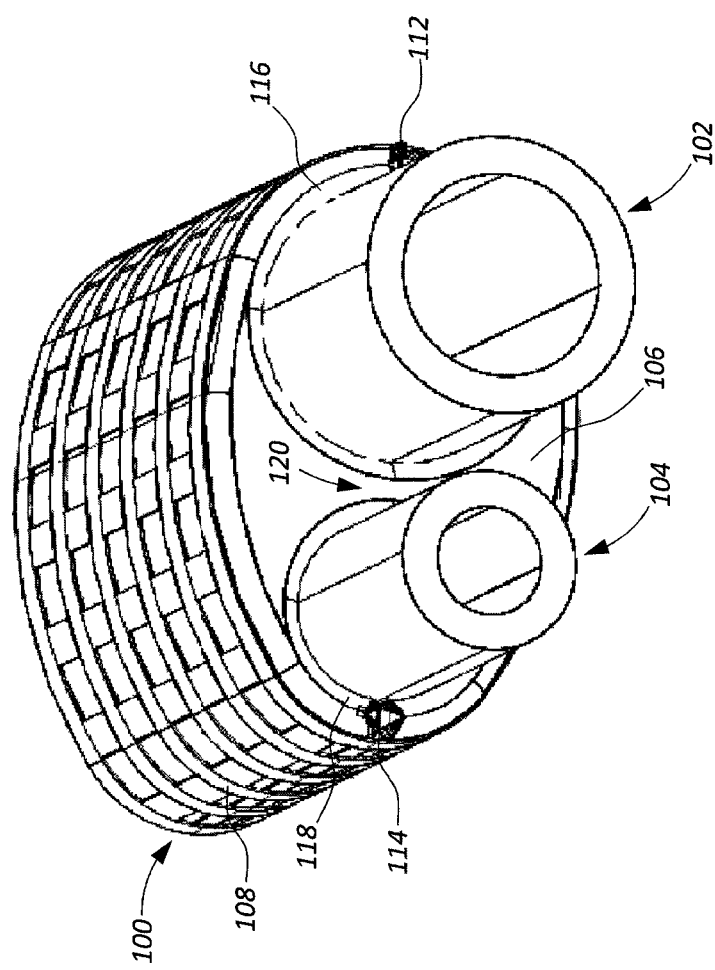
FIG. 1B shows a back isometric illustration of an exemplary inflatable connector, in accordance with an embodiment.

The present disclosure may be better understood with reference to the accompanying figures. Reference is now made to FIG. 1A and FIG. 1B, which show front and back isometric illustrations, respectively, of an exemplary inflatable connector (or "connector" for short) 100. Connector 100 may at least partially encompass and secure two pipes 102 and 104. Connector 100 may comprise an elliptic cylindrical bladder 106, which may be made of one or more materials, such as elastomers, which are sealed from certain fluids.

An elastomer may be a polymer with viscoelasticity, generally having low Young's modulus (a measure of the stiffness of an elastic material) and high failure strain compared with other materials. The term, which is derived from elastic polymer, is often used interchangeably with the term rubber, although the latter is preferred when referring to vulcanisates. Each of the monomers which link to form the polymer may be usually made of carbon, hydrogen, oxygen and/or silicon. Elastomers may be amorphous polymers existing above their glass transition temperature, so that considerable segmental motion is possible. At ambient temperatures, rubbers are thus relatively soft (E~3 MPa) and deformable. Their primary uses are for seals, adhesives and molded flexible parts. The molecular structure of elastomers may be imagined as a "spaghetti and meatball" structure, with the meatballs signifying cross-links. The elasticity is derived from the ability of the long chains to reconfigure themselves to distribute an applied stress. The covalent cross-linkages may ensure that the elastomer may return to its original configuration when the stress is removed. As a result of this extreme flexibility, elastomers may reversibly extend from 5-700%, depending on the specific material. Without the cross-linkages or with short, uneasily reconfigured chains, the applied stress would result in a permanent deformation. Elastomers may be highly durable. Some of them may function in a temperature range of $(-55° C.) \div (+150° C.)$, and may withstand a tensile strength of ~20 MPa. The elastomer may be, but not limited to, one of the follows: Natural polyisoprene: cis-1,4-polyisoprene natural rubber (NR) and trans-1,4-polyisoprene gutta-percha, Synthetic polyisoprene (IR for Isoprene Rubber), Polybutadiene (BR for Butadiene Rubber), Chloroprene rubber (CR), polychloroprene, Neoprene, Baypren etc., Butyl rubber (copolymer of isobutylene and isoprene, IIR), Halogenated butyl rubbers (chloro butyl rubber: CIIR; bromo butyl rubber: BIIR), Styrene-butadiene Rubber (copolymer of styrene and butadiene, SBR), Nitrile rubber (copolymer of butadiene and acrylonitrile, NBR), also called Buna N rubbers, Hydrogenated Nitrile Rubbers (HNBR) Therban and Zetpol, EPM (ethylene propylene rubber, a copolymer of ethylene and propylene) and EPDM rubber (ethylene propylene diene rubber, a terpolymer of ethylene, propylene and a diene-component), Epichlorohydrin rubber (ECO), Polyacrylic rubber (ACM, ABR), Silicone rubber (SI, Q, VMQ), Fluorosilicone Rubber (FVMQ), Fluoroelastomers (FKM, and FEPM) Viton, Tecnoflon, Fluorel, Aflas and Dai-El, Perfluoroelastomers (FFKM) Tecnoflon PFR, Kalrez, Chemraz, Perlast, Polyether block amides (PEBA), Chlorosulfonated polyethylene (CSM), (Hypalon), Ethylene-vinyl acetate (EVA).

In a different embodiment (not shown), a bladder may have a different general shape, such as a circular cylinder, parabolic cylinder, hyperbolic cylinder, rectangular, polyhedral and/or the like. A bladder may be formed in different sizes and shapes, depending on the application, size of secured pipes, environmental conditions, etc. For example, the diameter of pipes which are used to form the top rims of fish cages may reach few dozen centimeters.

Connector 100 optionally includes a harness 108 which may comprise a mesh configured to encircle bladder 106. One or more inflation nipples, such as an inflation nipple 110, may serve to inflate and deflate bladder 106.

Bladder 106 may further include two or more elongated openings, such as openings 112 and 114, shaped to allow insertion of at least two sections of pipe(s).

While bladder 106 is deflated and harness 108 is not worn over bladder 106, pipes 102 and 104 may be inserted to bladder 106 through openings 112 and 114 (respectively) to pipe securing areas 116 and 118 (respectively), in such way that pipes 102 and 104 are at least partially encompassed by bladder 106 in a parallel manner.

As shown in FIGS. 1A-B, pipe securing areas 116 and 118 may be formed as two separate cylindrical voids in bladder 106, extending along the entirety of the length of the bladder. Pipe securing areas 116 and 118 may be completely separated from each other by a portion of bladder 106, which portion is marked, generally, with the reference numeral 120. Namely, the voids which form securing areas 116 and 118 may be completely separate from one another, such that, when bladder 106 is inflated, portion 120 provides an inflated separator between the securing areas and thus between pipes 102 and 104.

After pipes 102 and 104 are inserted to bladder 106, harness 108 may be worn and tightened on bladder 106. Bladder 106 may be then inflated to a specific pressure, which may stiffen bladder 106 to allow a firm grip of pipes 102 and 104 on one hand, but may also allow bladder 106 to stay resilient enough to absorb and cushion movements of pipes 102 and 104 on the other hand. When bladder 106 is inflated, harness 108 may tightly hold the formation of bladder 106, preventing dislocating of pipes 102 and 104.

Bladder 106 may be inflated with a gas (e.g. air, helium, etc.) or liquid (e.g. water, oil, etc.), depending on the application and the desired flexibility of bladder 106. Generally, different filling materials vary in their viscosities and thus result in different flexibilities. The inflating may be done by connecting inflation nipple 110 to a pressurized gas and/or water source, such as a pump and/or a pressurized gas tank. If inflated with gas, bladder 106 may be buoyant. Bladder 106 and/or harness 108 may be colored with a prominent color, to be distinguished easily when deployed in water.

Figure 2:
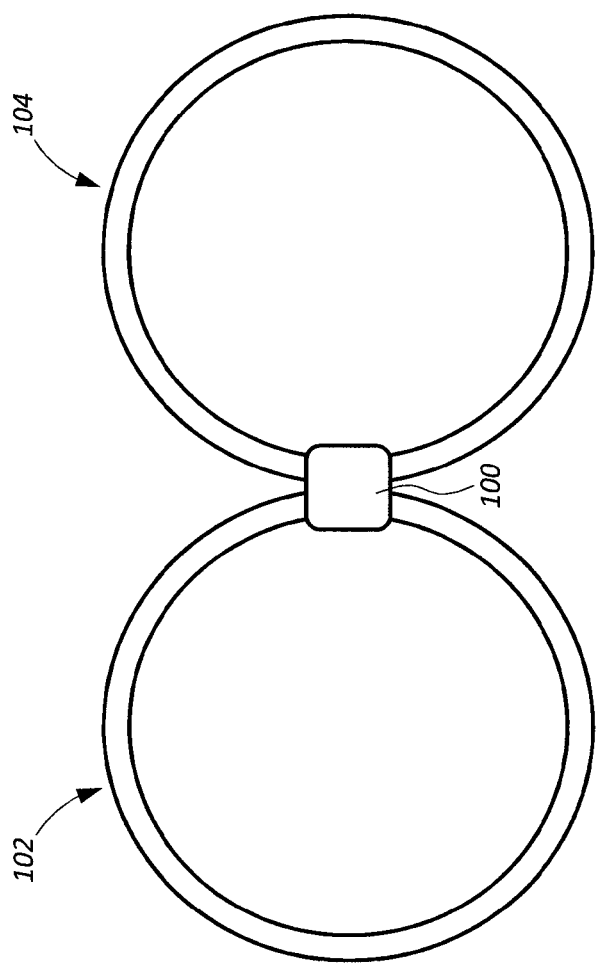
FIG. 2 shows a top view illustration of an exemplary inflatable connector connecting two circular pipes, in accordance with an embodiment.

Reference is now made to FIG. 2, which shows a top view illustration of an inflatable connector connecting two circular pipes. As can be seen, connector 100 may secure pipes 102 and 104, which may be circular (e.g. to form the top rims of fish cages). Since the secured pipe portions may be short in relation to the entire pipe's circumference, it may be assumed that the secured pipe portions may be substantially parallel to one another.

In another embodiment, the number of pipes needed to be secured by the connector may be higher than two, for example a "hub" connector located in the middle between multiple pipe structures. In that case, a different connector (not shown) may be formed in a different formation, containing more pipe securing areas. As may be understood from this example, the securing areas and the secured pipes may be non-parallel one to another. Also, pipe securing areas may be non-cylindrical, to support a variety of pipe shapes.

Figure 3:
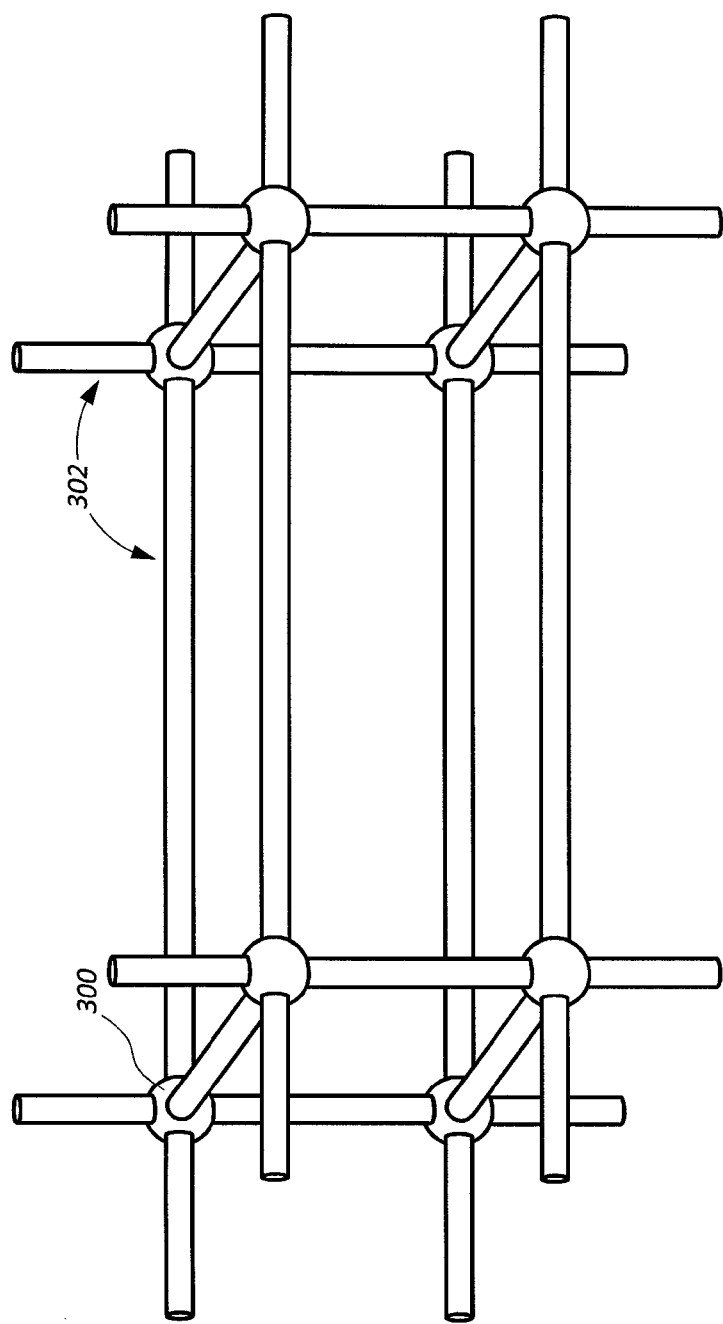
FIG. 3 shows an illustration of scaffolds connected with inflated connectors, in accordance with an embodiment.

The inflated connector may have various applications. Reference is now made to FIG. 3, which shows an illustration of scaffolds connected with inflated connectors. An inflated connector 300, which by example herein its bladder may be formed in a spherical-like shape, may encompass scaffolds 302 at some or all of the scaffold intersections. The pipe secure areas and openings of connector 300 may be formed to fit crossing and perpendicular scaffolds, enabling firm grasping of the scaffolds. Connector 300 may be formed in different configurations, to fit different locations in the scaffolding structure (i.e. middle, side, corner, etc.).

In the description and claims of the application, each of the words "comprise" "include" and "have", and forms thereof, are not necessarily limited to members in a list with which the words may be associated. In addition, where there are inconsistencies between this application and any document incorporated by reference, it is hereby intended that the present application controls.

What is claimed is:

1. An inflatable connector comprising:
   a bladder having at least two pipe securing areas formed as at least two separate cylindrical voids, respectively, in said bladder, wherein said at least two separate cylindrical voids are completely separated by a portion of said bladder and are configured to at least partially encompass at least two pipe portions, respectively,
   wherein said bladder is configured, when deflated, to enable insertion of said at least two pipe portions into said at least two pipe securing areas, respectively, and
   wherein said bladder is configured, when inflated, to secure said at least two pipe portions in said at least two pipe securing areas, respectively.

2. The inflatable connector according to claim 1, further comprising a harness configured to encircle said bladder together with said at least two pipe portions, so as to secure said bladder and said at least two pipe portions together.

3. The inflatable connector according to claim 2, wherein said harness comprises a mesh.

4. The inflatable connector according to claim 1, further comprising an inflation nipple.

5. The inflatable connector according to claim 1, wherein said at least two pipe securing areas are each substantially cylindrical.

6. The inflatable connector according to claim 1, wherein said at least two pipe securing areas are substantially parallel, such that, when said bladder is inflated, said at least two pipe portions are secured substantially parallel to one another.

7. The inflatable connector according to claim 1, wherein said at least two pipe securing areas are non-parallel, such that, when said bladder is inflated, said at least two pipe portions are secured non-parallel to one another.

8. The inflatable connector according to claim 1, wherein said at least two pipe securing areas comprise at least three pipe securing areas.

9. The inflatable connector according to claim 1, wherein said at least two pipe securing areas comprise at least four pipe securing areas.

10. The inflatable connector according to claim 1, wherein said at least two pipe portions are rims of fish cages.

11. The inflatable connector according to claim 1, wherein said at least two pipe portions are scaffoldings.

12. The inflatable connector according to claim 1, wherein said bladder is made of an elastomeric material.

13. The inflatable connector according to claim 1, wherein said bladder is filled with a gas.

14. The inflatable connector according to claim 1, wherein said bladder is filled with a liquid.

15. The inflatable connector according to claim 1, wherein said bladder is buoyant when inflated.

\* \* \* \* \*